United States Patent [19]

Pioch

[11] 3,741,662

[45] June 26, 1973

[54] VISIBLE LINE MARKER
[76] Inventor: Willis C. Pioch, 20 Roosevelt Avenue, East Paterson, N.J. 07407
[22] Filed: June 16, 1971
[21] Appl. No.: 153,755

[52] U.S. Cl. ............................................... 356/172
[51] Int. Cl. .......................................... G01b 11/26
[58] Field of Search ................... 331/94.5; 356/172

[56] References Cited
UNITED STATES PATENTS

| | | | |
|---|---|---|---|
| 3,627,429 | 12/1971 | Jaenicke | 331/94.5 |
| 3,653,384 | 4/1972 | Swope | 331/94.5 |
| 3,404,350 | 10/1968 | Muncheryan | 331/94.5 |
| 3,447,033 | 5/1969 | Redmond et al. | 331/94.5 |
| 3,474,248 | 10/1969 | Brown et al. | 331/94.5 |
| 3,548,212 | 12/1970 | Whetter | 331/94.5 |
| 3,107,168 | 10/1963 | Hogan et al. | 356/172 |

*Primary Examiner*—William L. Sikes
*Attorney*—Edward F. Levy

[57] ABSTRACT

Apparatus for forming visible lines of demarcation for sporting events, such as football, tennis and horse racing. The apparatus comprises laser beam generating means which projects a low intensity visible laser beam to form the lines of demarcation. The crossing of such light beam demarcation lines is indicated by illuminating the object when it crosses the line.

2 Claims, 3 Drawing Figures

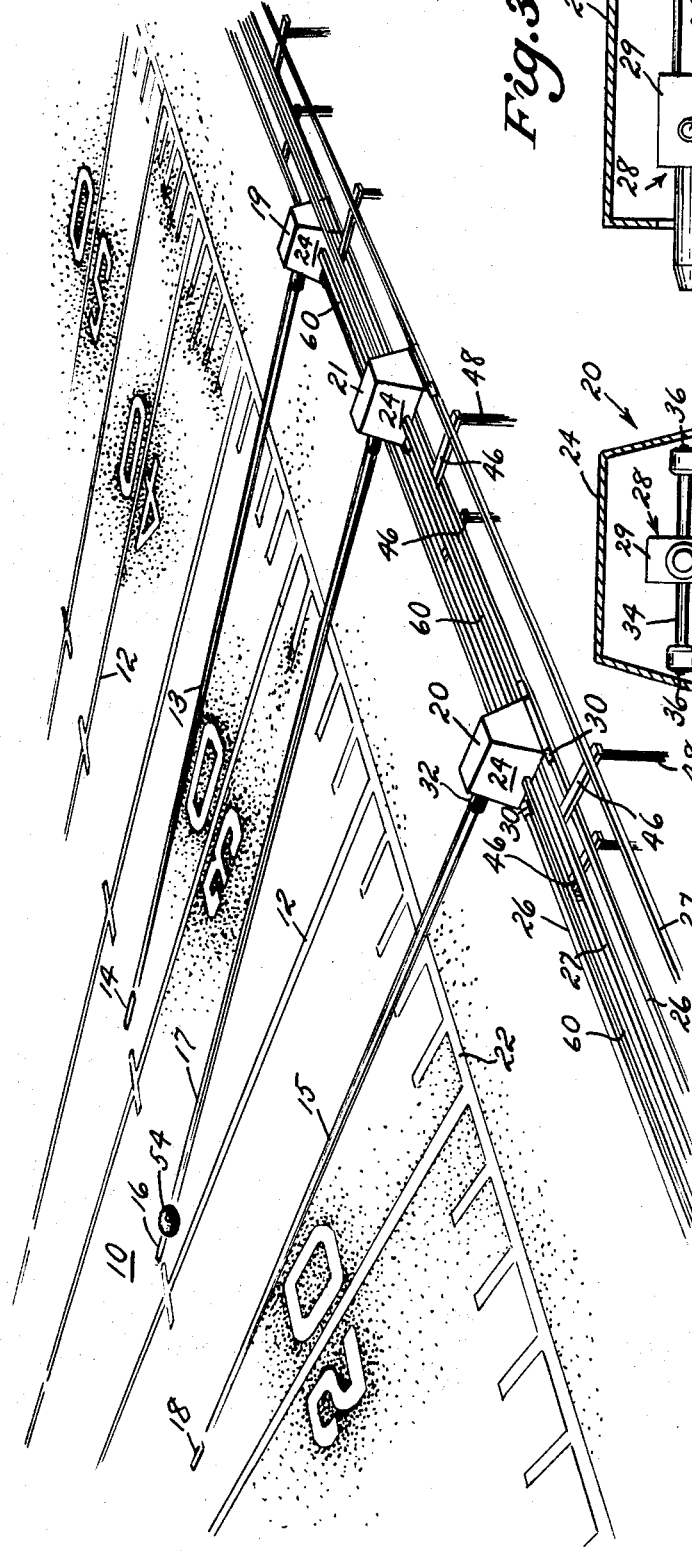

VISIBLE LINE MARKER

This invention relates to a device for use in sporting events, and more particularly, to a device which provides an accurate line of demarcation used in such events.

In athletic events such as football, baseball, tennis, etc., lines of demarcation such as boundary or "out-of-bounds" lines are used. In tennis, for instance, it is important to accurately determine when the ball lands out of bounds.

In football, an important line of demarcation is the first down marker or line which is located ten yards from the starting point for a series of offensive plays or downs. If the ball is not moved at least ten yards in four downs or plays, the team on offense loses possession of the ball. Presently, this ten yard distance is determined by a set of chains held in position along the sidelines, with one stake or marker placed at approximately the point of the initial line of scrimmage. Frequently, during play, the offensive team advances approximately 10 yards, and in such a situation, a "measurement" is made using the chains. The chain crew attempts to move parallel to the yard lines, so that when the marker is placed in mid-field, it is located at the same point as it was on the sidelines. Obviously, such an antiquated procedure is quite inaccurate, and in view of the extreme importance of such a measurement, is unwarranted.

During tennis matches, the linesmen have frequent occasion to determine when a ball lands out of bounds. Often, their judgments are faulty because of the difficulty in making such visual determinations. This situation is relatively intolerable in view of the importance of such calls.

An object of this invention is to provide more accurate means for determining when a line of demarcation is crossed.

Another object of this invention is to provide means for making such a determination which is less dependent upon the human factor.

Yet another object of this invention is to provide such a means which may be conveniently used for sporting events such as football, tennis and horse racing.

Still another object of this invention is to provide such means, the operation of which does not interfere with the course of the sporting event.

Other objects, advantages and features of this invention will become more apparent from the following description.

In accordance with the principles of this invention, the above objects are accomplished by providing an apparatus for forming a line of demarcation for the surface of the field or court of a sporting event which comprises laser beam generating means for generating a visible beam of light and means for aiming the beam of light to form the line of demarcation. The laser beam is of a low intensity and provides a straight, accurate visible line which is fixed.

When used for football, the apparatus comprises a housing in which the laser beam generating means is contained. The housing is slideable along parallel guide rails which are installed parallel to and a distance from the sidelines. Preferably, three such laser beam generating means are used to form the initial scrimmage line, the ten yard first down line and the present line of scrimmage.

In accordance with a feature of this invention, the housing is swiveled about a horizontal axis so that the laser beam is vertically swept across the field to provide an even more effective and visible line of demarcation which will illuminate an object in its path, such as a football.

The invention will be further described with reference to embodiments thereof, illustrated by way of example on the accompanying drawings in which:

FIG. 1 is a perspective view of an embodiment of this invention illustrated for use on a football field;

FIG. 2 is a front elevation view of the laser beam generating device and housing therefor with portions thereof shown in section to reveal inner constructional details; and FIG. 3 is a side elevation view of the laser beam device illustrated in FIG. 2 with portions thereof shown in section.

Referring to the drawings, and more particularly to FIG. 1, there is shown a football field 10 with yard lines 12 extending across the field every five yards. During the course of play, certain lines of demarcation are used. Of particular significance, and as illustrated in FIG. 1, are the initial scrimmage line 14, present scrimmage line 16 and first down ten yard line 18.

In accordance with this invention, visible beams of light 13, 15 and 17 are generated which form the above-mentioned demarcation lines. These lines are generated by laser beam generating devices 19, 20 and 21, respectively, which are located a distance from the sidelines 22 of the field 10. The laser beams are aimed to be parallel to the yard lines to form the lines of demarcation.

The laser beam generating devices 19, 20 and 21 are identical and each comprises a housing 24. The housing for devices 19 and 20 are slideable along a parallel set of guide rails 26, while the housing for device 21 is slideable along a pair of higher guide rails 27, with both sets of guide rails being parallel to the sidelines 22. The laser beams may be generated by any conventional well-known apparatus and preferably are low intensity, low power beams.

Referring now to FIGS. 2 and 3, only laser beam generating device 20 is shown in greater detail since devices 19 and 21 are identical to device 20. Device 20 includes a laser beam generating means 28 contained in a housing 29, which itself is contained in housing 24. Housing 24 is supported on pairs of spaced apart sleeve members 30, which are slideable on guide rails 26. The beam is projected through a frontwardly projecting lens system 32 in the direction of the field. The housing 29 for the laser beam generating means is connected between support bars 34 which are pivotally connected at their outer ends 36 to vertical support members 38. An arm 40 is attached to and projects from the rear of the laser beam housing 29 for manually swivelling the housing about a horizontal axis. In addition, a motor 42 contained within housing 24 is eccentrically connected, as by a cam 44, to the rear of laser beam housing 29 for automatically swivelling the housing about the horizontal axis. When the housing is so swiveled, the projected beam of light is vertically moved and sweeps across the field to form an even more effective and visible line of demarcation.

As a feature of this invention, the guide rails 26 may be electrically conductive to carry power required to generate the laser beam and operate the motor. In this manner, unwieldy and long electrical wires may be avoided since the power is available anywhere along the rails.

The guide rails 26 and 27 are supported by cross-bars 46 which themselves are supported by vertical post members 48 adapted to be inserted in submerged sockets 50. The sockets 50 are formed by drilling a vertical hole in the ground and inserting a cylinder within the drilled-out hole to form the socket with a natural stop 52 being formed at the bottom of the socket. As can be readily appreciated, the guide rails must be parallel to the ground to prevent slanting of the projected laser beam and therefore, the depth of each socket may vary slightly to enable this parallel relationship to be maintained. The support posts are removable from the sockets so that when the field is to be used for other purposes, the demarcation line apparatus can be disassembled and removed from the playing field. Suitable plugs are provided to cover the sockets 50 when the apparatus is removed.

The demarcation line apparatus operates as follows: Assuming that the direction of play is to the left or downfield, as viewed in FIG. 1, and a first down has just been made, the device 21 is moved along its pair of tracks 27 and is aimed at a designated spot on the ball 54, this spot being preferably the forward tip thereof. The arm 40 may be used for this purpose in tilting the laser housing 29 until the beam 17 is directly upon the ball.

The device 19 is now moved along its tracks 26 until its beam 13 is in registry with the beam 17, and is manually tilted until it also is aimed directly at ball 54 to establish an initial line of scrimmage. The devices 19 and 20 are connected by an elongated spacing rod 60 which is of such a length that the beams 13 and 15 of the respective devices 19 and 20 are always located exactly ten yards apart. Thus, the beam 15 of the device 20 provides a visible first down marker across the field. The motors 42 of each device 19, 20 and 21 are now energized to move each laser housing 29 vertically and periodically upwardly and downwardly about its pivot 36, thus waving the laser beam vertically and causing a continuous light beam to be visible across the width of the field.

As each play is completed, device 21 is aimed at the designated spot on the ball to provide a visible indication of the present line of scrimmage. In order to determine if the offensive team has made a first down, the beam of light emanating from device 20 is aimed at the ball, and if the spot is illuminated or is located forwardly of the beam, the first down will have been made.

The set of laser beam generating devices are then moved to a new set of locations and the above-described operation is repeated.

From the above, it is seen that the present apparatus provides a more effective method of determining the measurement for first downs and eliminates both the guesswork and human error in making such a determination.

Although this invention has been described for use with football, its application to other sporting events, such as tennis and horse racing is believed to be readily apparent. In tennis, the linesman will no longer have to depend on his visual perception alone since an out-of-bounds ball will be indicated when the ball is illuminated in red prior to bouncing. If the ball bounces before being illuminated, it must, of necessity, have fallen within the out-of-bounds lines. In horse racing, the beam of light can be used to form a visible finish line at the level of the horse's head while eliminating the error presently occurring with the finish line located substantially above this level.

It will thus be seen that the objects set forth above, among those made apparent from the preceding description, are efficiently attained and, since certain changes may be made in the above apparatus without departing from the scope of the invention, it is intended that all matter contained in the above description and shown in the accompanying drawings shall be interpreted as illustrative and not in a limiting sense.

What is claimed is:

1. A method of providing a constant wall of visible light for visually demarcating, even in daylight, scoring or score advancing lines in a sporting event or the like played in a restricted area wherein movement through said light wall is of significance in the playing of said sporting event, comprising the steps of directing a laser beam horizontally from outside said restricted area at a selected distance above ground level in a direction to define said scoring line, and reciprocating said beam vertically in a continuous periodic up-and-down motion so as to create and maintain a vertical wall of light across at least a substantial portion of the restricted area in a selected direction and at a selected height such that said beam of light provides a visible wall of light that will be passed through during the course of playing whereby the presence of said light wall and its penetration will be visible to spectators watching such sporting event.

2. A method according to claim 1 which includes the additional step of moving said laser beam horizontally along said restricted area at selected intervals to provide said advancing lines when determined during the playing of said sporting event.

* * * * *